US005580111A

United States Patent [19]
Bohn

[11] Patent Number: 5,580,111
[45] Date of Patent: Dec. 3, 1996

[54] ANIMAL WASTE AND LITTER SCOOP

[76] Inventor: Jamie Bohn, 526 Lakeside Ct., Shawnee, Okla. 74801

[21] Appl. No.: 542,195

[22] Filed: Oct. 12, 1995

[51] Int. Cl.$^6$ .............................. A01K 29/00; E01H 1/12
[52] U.S. Cl. ............................................ 294/1.3; 294/55
[58] Field of Search .......................... 294/1.1, 1.3, 1.4, 294/9, 49, 55; 15/257.1, 257.3, 257.4, 257.6; 119/161; 141/108, 109, 390, 391; 209/417–419

[56] References Cited

U.S. PATENT DOCUMENTS

| | | | |
|---|---|---|---|
| D. 255,951 | 7/1980 | Halls et al. | 294/1.3 X |
| 316,623 | 4/1885 | Hooper | 209/419 |
| 366,887 | 7/1887 | Scholes | 209/419 |
| 1,987,011 | 1/1935 | Kahn | 294/55 X |
| 3,986,744 | 10/1976 | Krogstad et al. | 294/1.3 |
| 4,149,745 | 4/1979 | Willis | 294/1.4 |
| 4,279,437 | 7/1981 | Goldberg | 294/1.4 |
| 5,107,666 | 4/1992 | Rahtican | 294/1.1 X |
| 5,190,326 | 3/1993 | Nunn | 294/1.3 |
| 5,417,044 | 5/1995 | Russo | 294/55 X |

*Primary Examiner*—Johnny D. Cherry
*Attorney, Agent, or Firm*—Marshall, O'Toole, Gerstein, Murray & Borun

[57] ABSTRACT

A device and method for handling animal waste products. Preferably, the device is used to separate animal waste products from unsoiled pet litter. In one embodiment, the device includes a waste-transferring handle that has a leading edge with an integral grate, and a trailing end that receives a removable waste-receiving receptacle. The grate includes cross members having crested upper surfaces. The spaces between the cross members define openings which retain animal waste and allow unsoiled litter to pass between. The crested upper surfaces of the cross members allow unsoiled litter to pass through the grate easily and preferably without shaking of the device.

18 Claims, 3 Drawing Sheets

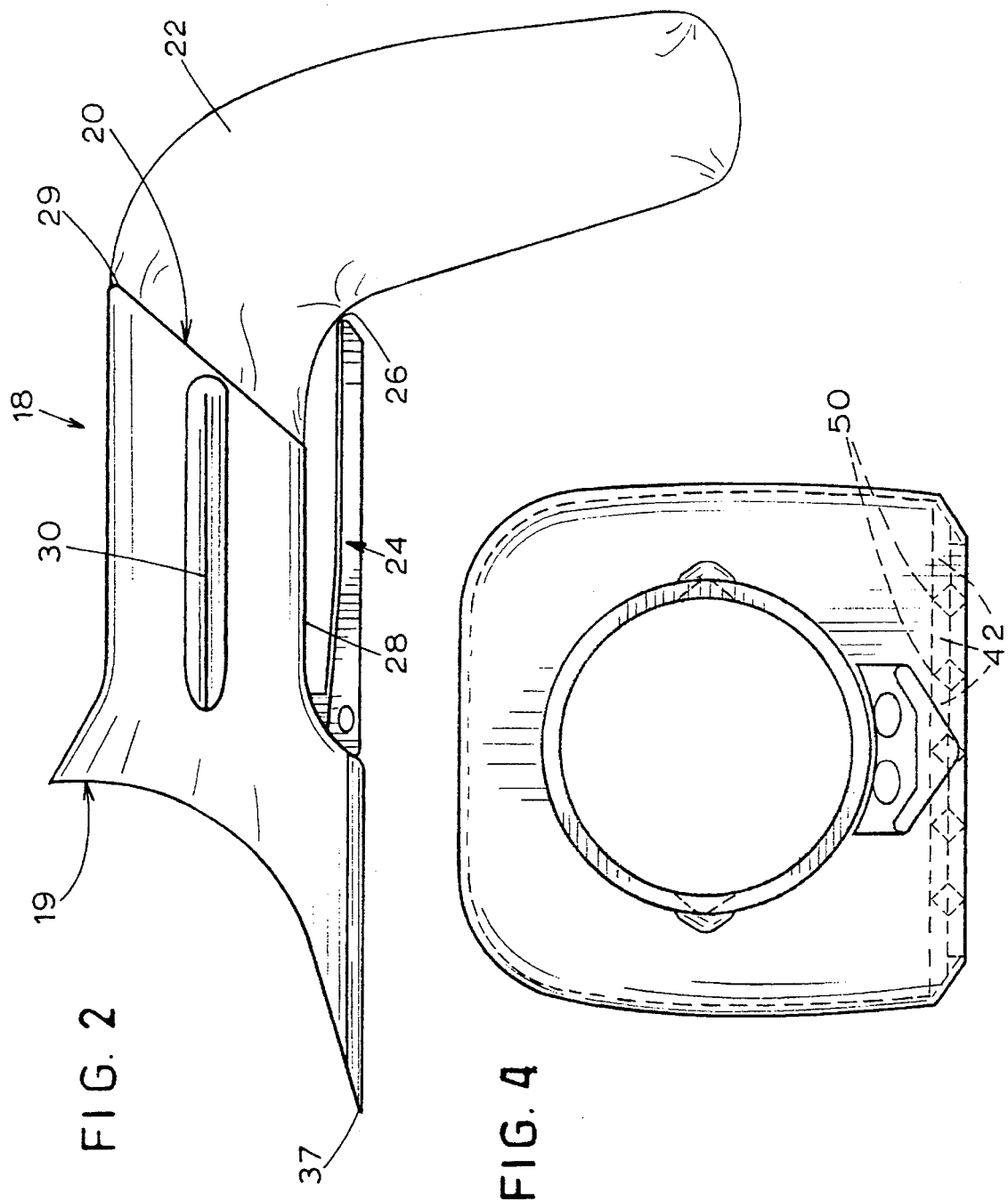

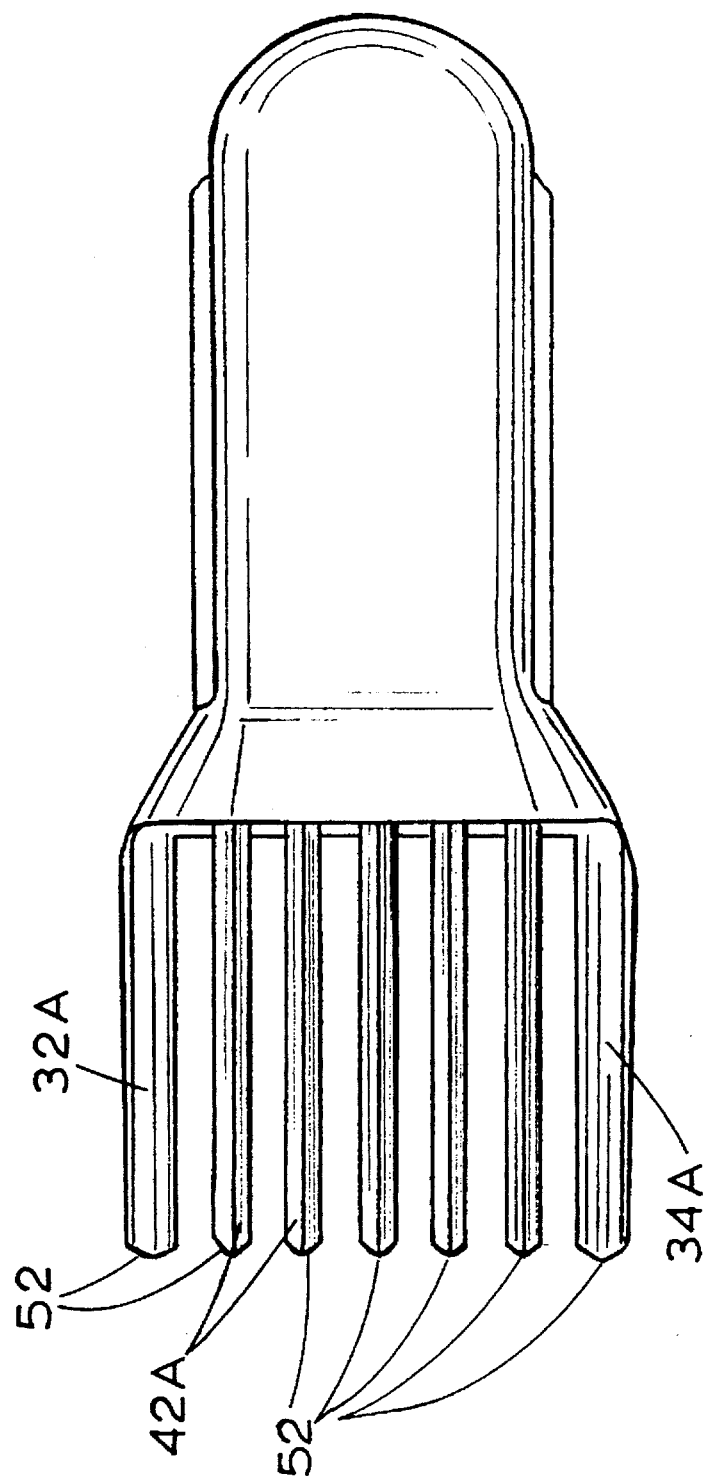

ANIMAL WASTE AND LITTER SCOOP

FIELD OF THE INVENTION

The present invention is directed to a device for handling animal waste products. More particularly, the present invention is directed to a pet litter scoop that scoops and captures animal feces from a surface, and is particularly effective for separating animal waste products from unsoiled animal litter, and conveniently deposits the animal waste into a collection bag.

BACKGROUND OF THE INVENTION AND PRIOR ART

A need exists, especially in urban areas, and most especially inside the home, to easily dispose of pet waste products, e.g., urine and fecal matter. Some pets eliminate their waste products outside the home. Many urban areas have laws which require collection and disposal of solid pet wastes. House-broken animals, such as cats, are trained into the habit of urinating and defecating in a specially provided litter box. Similarly, untrained and caged animals, such as guinea pigs, urinate and defecate on the floor of their cage, often in the same floor area of the cage. Consequently, animal owners, pet owners, veterinarians, and laboratory personnel place absorbent materials on a floor area of their litter box or cage to collect the animal's urine and feces. It is periodically necessary, to eliminate or reduce odors, for example, to physically separate animal waste material and soiled litter from the unsoiled litter.

Litter scoops currently on the market have some disadvantages. Devices which resemble a slotted spoon are inconvenient due to the potential for spillage and the need to have nearby a waste receptacle to minimize spillage of scooped animal waste during transport of the waste from the area where the animal deposits the waste to the waste receptacle. Particular difficulty arises when the waste receptacle is a bag and must be held open with a single hand, while scooping the animal waste with the slotted spoon using another hand.

One example of a scoop-like device for use in cleaning pet litter is disclosed in Halls U.S. Pat. No. DES 255,951 ('951). The '951 scoop device includes a housing with slots formed in a flat bottom portion, and the device requires agitation to perform separation of litter from waste and, accordingly, can easily result in spillage. Further, transfer of waste to a receptacle appears to require emptying the scoop a plurality of times, again increasing the chance of spillage.

SUMMARY OF THE INVENTION

In brief, the present invention is directed to a device and method for collecting animal waste products, particularly household pet waste products. In accordance with the invention, the scoop is structured to provide efficient and convenient handling and subsequent disposal of animal waste, particularly pet waste.

The animal litter scoop of the present invention scoops and transfers animal waste and/or soiled animal litter material from a slotted scooping end, through a transferring handle or housing to a removable waste collection receptacle or bag. The slotted scoop end of the device includes a grate, which is integral with a leading end of the housing and includes a frame integral with a plurality of cross members. Each cross member, which define slots or openings therebetween for return of unsoiled litter material, has an upper surface that preferably is formed in a pointed crest, e.g., an inverted v-shape or an inverted u-shape.

In accordance with a preferred embodiment of the present invention, the pet litter scoop includes a receptacle-contacting and pinching means for contact against a side of the receptacle, along a line below the transferring means or housing, to prevent the receptacle from draping into the soiled animal litter during the scooping operation once waste is received in the collection receptacle. In accordance with a preferred embodiment of the present invention, the receptacle-contacting means comprises a tongue member disposed to engage the waste collection receptacle between its open end and its closed end, to minimize the extent that a partially filled receptacle can drape forward under the device during the scooping step, by contact against a side of the receptacle. When partially full of animal waste and/or soiled litter material, the receptacle will be pinched or folded along a continuous line along the width of the receptacle where the tongue engages the receptacle, thereby minimizing forward draping of the receptacle. Further, since the receptacle can have an opening that is substantially wider than the diameter of the transferring handle that the receptacle is secured around in use, the receptacle contacting means or tongue member folds the receptacle along a line below the housing, where the tongue member contacts the receptacle during use, thereby preventing collected waste from travelling upwardly toward the bag opening. The tongue member, therefore, also prevents collected waste from falling out of the receptacle opening, in an area where the receptacle opening is not secured by a user's hand against the transferring handle, when a rear end of the device is tilted upwardly during the scooping process.

In accordance with another preferred and important feature of the present invention, the tongue member has a free or terminal end that is disposed adjacent a trailing end of the scoop housing for contacting and pinching the waste receptacle along a fold line spaced from and below a rear terminal end of the scoop housing.

Accordingly, an aspect of the present invention is to provide an animal litter scoop for collecting animal waste and/or for separating soiled litter material and animal waste from unsoiled animal litter.

Another aspect of the present invention is to provide an animal litter scoop that includes a slotted scoop disposed at a leading end, an integral waste transferring means or housing having a funnel-shaped (tapered) leading end for transferring waste toward a trailing handle end, wherein the trailing handle end is adapted to receive a removable receptacle for collection of the waste material.

In accordance with a preferred aspect of the present invention, the animal scoop includes a receptacle-contacting means for preventing the receptacle from draping forward into the waste being scooped and to prevent backflow of animal waste and/or soiled litter material from the collection receptacle toward an open end of the receptacle. In a preferred embodiment, the receptacle-containing means comprises a tongue member for engaging and folding the waste collection receptacle and extends rearwardly from a lower portion of the waste-transferring handle portion of the device and terminates adjacent to or rearwardly beyond the trailing end of the housing. The tongue member is spaced from the housing to allow an open end of a waste collection bag or receptacle to fit over the trailing end of the handle for waste collection.

Another aspect of the present invention is to provide a new and improved waste collection scoop having a grated scooping end adapted to be disposed under animal waste, wherein the grated scooping end includes cross members that have a circular, oval, diamond-shaped, or triangular cross-section, such that the cross member upper surfaces are crested, or have an inverted u-shape or an inverted v-shape.

Still another aspect of the present invention is to provide a waste collection scoop having a grated scooping end that includes cross members that define openings or slots therebetween which are specifically designed to retain waste thereon but will allow unsoiled litter to pass therethrough for automatic return to a litter box or animal shelter floor area.

Another aspect of the present invention is to provide a new and improved waste collection scoop having a housing that includes hand grips formed on the outer surface. In a preferred embodiment, the grips are formed on an exterior housing portion in the shape of longitudinal ridges, bumps, bulges, or the like protruding from the sides of the intermediate section or trailing end of the scoop housing.

Another aspect of the present invention is to provide a new and improved waste collection scoop that includes a grated scooping end having grate cross members extending from a frame base wherein the cross members have free ends terminating at a leading end of the scoop. The cross members have free ends which extend forward from the leading edge of the housing in the form of tines.

A further aspect of the present invention is to provide a new and improved method for scooping and transferring animal waste into a waste collection receptacle using the waste collection scoop. To collect animal waste, an open end of a disposable receptacle, such as a plastic bag, is disposed around a trailing end of the waste transferring handle and held in place with a user's hand. Then a leading, grated end of the scoop is disposed under the animal waste, or under a waste-containing litter material. Once disposed under the waste material, the scoop is lifted upwardly while leveling the scoop housing, thereby allowing material having a particle size smaller than the spacing of the grate cross members to fall through the spaces or slots between the cross members. The waste retained on the grate is transferred through the inside of the handle toward the trailing handle end and out an exit orifice into a waste collection receptacle, disposed over the trailing end of the handle, by tilting the handle upwardly at the grate end of the scoop sufficiently to cause the waste to fall into the receptacle.

The above and other aspects and advantages of the present invention will become more apparent from the following detailed description of the preferred embodiments of the invention, taken in conjunction with the drawings.

BRIEF DESCRIPTION OF THE DRAWINGS

FIG. 2 is a side view of the scoop device of FIG. 1 also having a removable waste collection receptacle attached to its trailing end;

FIG. 4 is an enlarged front view of the scoop device of the present invention; and FIG. 5 is a top view of another embodiment of the scoop device of the present invention.

DETAILED DESCRIPTION OF THE PREFERRED EMBODIMENTS

Figure 1:
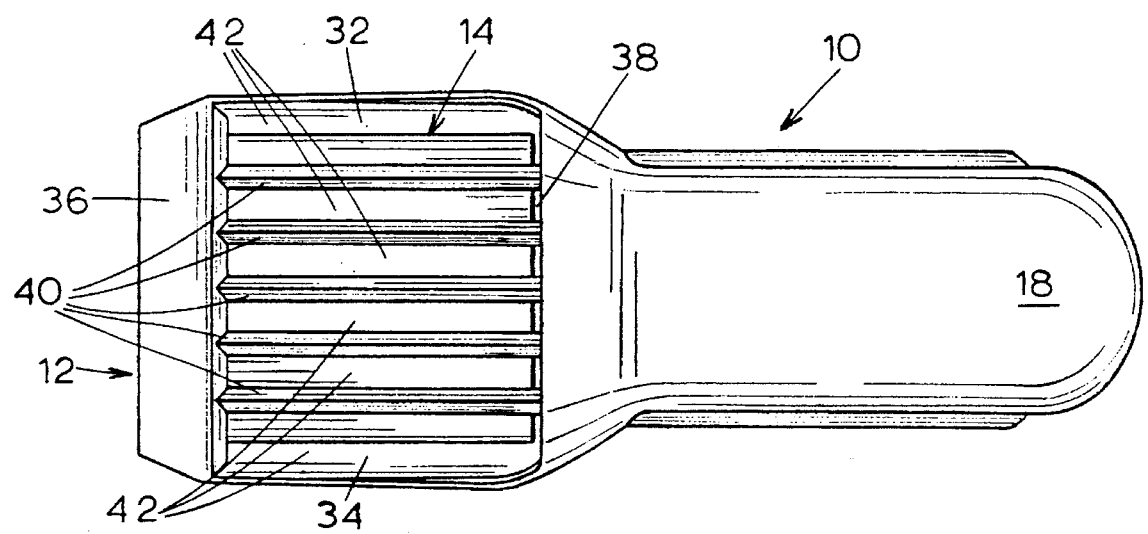
FIG. 1 is a top view of the scoop device of the present invention.
Figure 3:
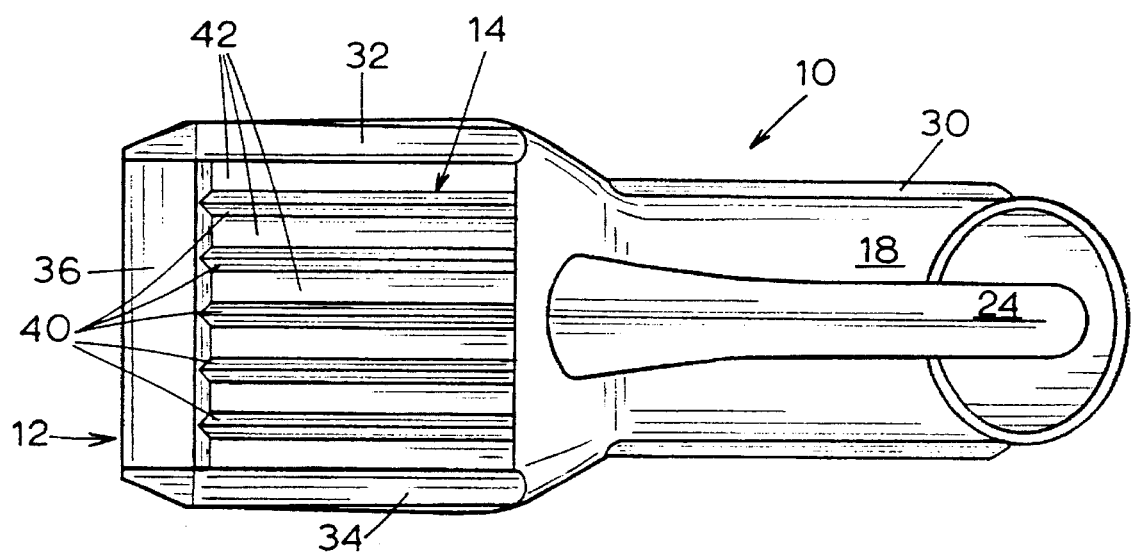
FIG. 3 is a bottom view of the scoop device of FIG. 1.

The animal waste and litter scoop of the present invention scoops and transfers animal waste and/or soiled animal litter material from a slotted scooping end, through a housing to a removable waste collection receptacle or bag. As best shown in FIG. 1, the waste and litter scoop, generally designated by reference numeral 10, includes a leading end, generally designated 12, that includes an integral slotted grate structure, generally designated 14; a hollow, tubular transferring handle, generally designated 18, preferably having a funnel-shaped (tapered) opening at its leading end, said opening generally designated 19, which is integral with the leading end 12; said handle 18 including a trailing end, generally designated 20, that receives a removable waste collection receptacle or bag 22 thereover. The circumference of the transferring handle 18 is larger than a hand span in order to allow sufficient space for the relatively unencumbered transfer of waste. In the preferred embodiment, the outer diameter of the transferring handle 18 is in the range of about 2¼ inches to about 4 inches (circumference of about 7.07 inches to about 12.57 inches), more preferably in the range of about 2½ inches to about 3½ inches (circumference of about 7.85 inches to about 11 inches). The transferring handle 18 is configured to be held and operated with one hand wherein the hand is capable of securing the waste collection receptacle 22 over the trailing end 20 of the transferring handle 18 during its operation.

The waste transferring handle 18 may be made in a wide variety of ways. The transferring handle 18 is hollow and tubular for waste transfer from the opening 19 into the waste receptacle 22. The tubular structure may assume a variety of shapes including but not exclusive of oval, circular, triangular, irregular and the like. The circumference of the transferring handle 18 should be larger than a hand span to allow for sufficient space for the transfer of waste therethrough. The handle 18 is designed and configured to receive a waste collection container 22 thereover. The handle 18 is configured to be held and operated with one hand in a variety of ways including the addition of a gripping means 30 and contouring, among others. It may or may not contain the gripping means 30. The gripping means 30 may be longitudinal ridges, bumps, bulges, recesses, or other structural configurations or combinations of configurations that will assist in hand gripping. The transferring handle 18 may or may not have a funnel-shaped opening 19. The funnel-shaped opening 19 may be made in any of a variety of ways. The funnel-shaped opening 19 may be symmetrical or asymmetrical, it may extend around the entire circumference, or the opening 19 may be smaller than the entire circumference or the transferring handle 18. The trailing end 20 of the transferring handle 18 may be sloped downwardly, upwardly or may not be sloped.

In a preferred embodiment of the present invention, the scoop 10 includes an integral waste receptacle-contacting member or elongate tongue member, generally designated 24, extending rearwardly from the waste-transferring handle section 18, and terminating at trailing handle end 20. The tongue member 24 extends rearwardly, preferably in a disposition parallel to a longitudinal axis of the handle 18. Tongue 24 is spaced from a lower surface 28 of the handle 18 to provide a space for receiving a lower portion of the collection receptacle 20. In a preferred embodiment of the present invention, tongue end 26 is disposed approximately directly beneath a rearwardmost portion 29 of the trailing end 20 of the trailing handle section 18, or in a less preferred embodiment, extends rearwardly beyond the rearwardmost portion 29 of trailing end 20, when the scoop 10 is in a horizontal disposition, to prevent backflow of waste collected in the waste collection receptacle 22, during scooping, and to prevent the receptacle 22 from draping forward into the waste material being scooped. Also, in the preferred embodiment, an outer surface of the handle 18 includes gripping means such as longitudinal ridges, bumps or bulges 30 protruding outwardly from the scoop handle 18, for aiding to achieve a secure hand grip on the handle 18 during the scooping process.

The receptacle-contacting means 24 may be made in a variety of ways. It may be connected to the scoop device 10 at the transferring handle 18, the scope end 14 or both. The receptacle-contacting tongue 24 may be longer or shorter than the transferring handle 18 and may be made in flat, triangular, round, square, flat, irregular shapes or any of a wide variety of shapes that could satisfy design considerations and accomplish the desired functionality. The space between the bottom of the transferring handle 18 and the receptacle-contacting tongue member 24 may vary to accommodate waste container and design features.

As best shown in FIG. 2, in a preferred embodiment of the present invention, the trailing end 20 of the handle 18 is sloped downwardly toward the leading scoop end 12 from a rearwardmost, upper portion 29 of trailing end 20 to the lower handle surface 28 to assist in the loading of the receptacle 22 over the handle 18. The sloped end 20, preferably is at an angle of about 30° to about 60°, e.g., 45°, from horizontal to permit the receptacle 22 to be positioned easily over the trailing end 20 of handle 18 and so that animal waste and/or soiled litter material easily can be directed into the receptacle 22 with minimal upward tilting of the leading scoop end 12 with respect to trailing end 20.

As best shown in FIG. 1, in one embodiment of the present invention, the grate 14 is formed from spaced side frame members 32 and 34 integral with a spaced front frame member 36 and a rear frame member 38, preferably forming an open rectangle. Front frame member 36 is angled or sloped downwardly to form a thin, pointed front edge 37 (FIG. 2) for easy disposition of the leading scoop end 12 beneath animal waste or litter material. A plurality of cross members, generally designated 40, are disposed to interconnect the front frame member 36 and the rear frame member 38, each cross member 40 being spaced from an adjacent cross member to provide a plurality of spaces or slots 42 between adjacent cross members 40 and to provide a slot between the cross members 40 and side frame members 32 and 34. The slots preferably have a width w of about ¼ inch to about 5/16 inch to permit unsoiled litter material to pass therethrough, back to a litter box or back to an animal shelter floor, while the cross members retain any larger material, such as animal feces and clumped animal litter material, for example a urine-clumped cat litter agglomerate. Alternatively, the grate 14 may be formed from a perforated plate (not shown) and the cross members may be formed to include a flat upper surface or any combination of surface shapes and may extend in a horizontal direction (as shown in FIG. 1) or in a vertical direction, or both.

As best shown in FIG. 4, to achieve the full advantage of the present invention, an upper surface of the cross-members 40 are formed with crests 50 to avoid retention of unsoiled litter material, so that the unsoiled litter material passes through the slots 42 and back to a litter box (not shown) or to an animal shelter floor (not shown) for further use. Crests 50 can be provided by forming the cross members 40 to have a cross-section in the shape of an inverted v-shape or in an inverted u-shape, a circular-shape, a diamond-shape, as shown in FIG. 4, or triangular cross-section.

In another embodiment shown in FIG. 5, the grate does not include a front frame member 36 so that the front end of the grate comprises free grate ends 52 for easier disposition of cross members 42A and side frame members 32A and 34A beneath animal waste and/or soiled litter material. Alternatively, side frame members 32A and 34A can be omitted.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A pet litter scoop for scooping and transferring animal waste into a removable waste collection receptacle comprising:

a hollow waste-transferring handle comprising an open leading end and an open trailing end adapted to transfer waste from a grate to said open trailing end;

a waste collection receptacle removably connected to the open trailing end of the waste-transferring handle;

a grate integral with said open leading end of said handle comprising a frame and a plurality of cross members disposed therein, said cross members defining slots therebetween; and a receptacle-contacting means for contacting a side surface of the removable receptacle to lessen forward draping of said receptacle toward said animal waste during scooping by engaging said waste collection receptacle in an area between an open front end of said waste collection receptacle and a closed rear end of said waste collection receptacle.

2. The pet litter scoop of claim 1, wherein each of said cross members has a crested upper surface.

3. The pet litter scoop of claim 1, wherein each of said cross members has a diamond cross section.

4. The pet litter scoop of claim 1, further comprising gripping means for providing a secure hand grip on an outer surface of said handle, said gripping means being integral with an outer surface of said handle.

5. A pet litter scoop for separating soiled litter material and animal waste from unsoiled animal litter, comprising:

a hollow waste-transferring handle having a leading end, and a trailing end and having a circumference of about 7.07 inches to about 12.57 inches and such that the circumference is larger than a normal hand span of an intended user;

a separating means disposed adjacent said leading handle end for separating said animal waste from unsoiled litter;

said handle including a funnel-shaped opening at its leading end for transferring animal waste from said separating means to said trailing handle end, said handle having gripping means integral with an outer surface for providing a secure hand grip on said outer surface of said handle, with a waste collection receptacle disposed between said hand and said outer surface;

a discharge opening located at the said trailing end of said handle for discharging said animal waste into a waste collection receptacle;

a waste collection receptacle removably secured over the trailing end of said handle.

6. The pet litter scoop of claim 5 further including a tongue member for engaging the waste collection receptacle, said tongue member extending rearwardly under said handle, and terminating adjacent the trailing end of said handle.

7. The pet litter scoop of claim 6, wherein said tongue member is disposed to engage said waste collection receptacle between the handle, and a closed end of said receptacle.

8. The pet litter scoop of claim 6, wherein said handle has a longitudinal axis, and said tongue member has a longitudinal axis substantially parallel with said handle axis.

9. The pet litter scoop of claim 6, wherein said tongue member extends rearwardly past said trailing end of said handle.

10. The pet litter scoop of claim 5, wherein the waste-transferring handle has a circumference of about 7.85 inches to about 11 inches.

11. A pet litter scoop for scooping and transferring animal waste into a removable waste collection receptacle comprising:

a hollow waste-transferring handle means for hand gripping the scoop and for transferring waste from a scooping end to an open trailing end of the handle means, said waste-transferring handle means having a sufficient diameter to allow soiled litter clumps to pass therethrough and, having a circumference larger than a normal hand span of an intended user and including integral gripping means on its outer surface for providing a secure hand grip on an outer surface of said waste-transferring handle means with one hand with the removable waste collection receptacle disposed between the hand and the outer surface of the handle means;

a scooping means integral with said handle means for lifting and retaining animal waste and clumped litter material and allowing unsoiled litter material to pass therethrough; and a waste collection receptacle removably disposed over the trailing end of the handle means.

12. The pet litter scoop of claim 11, wherein said gripping means comprises structure selected from the group consisting of handle integral ridges, bumps, bulges and recesses.

13. The pet letter scoop of claim 11 further comprising:

a receptacle-contacting means for contacting a side surface of the removable receptacle to lessen forward draping of said receptacle toward said animal waste during scooping by engaging said waste collection receptacle in an area between an open front end of said waste collection receptacle and a closed rear end of said waste collection receptacle.

14. A method of separating soiled litter and animal waste from unsoiled litter using a pet litter scoop which includes:

a hollow waste-transferring handle having a leading end, and a trailing end and having a circumference of about 7.07 inches to about 12.57 inches and such that the circumference is larger than a normal hand span of an intended user;

a separating means disposed adjacent said leading handle end for separating said animal waste from unsoiled litter;

said handle including an opening at its leading end for transferring animal waste from said separating means to said trailing handle end and having gripping means integral with an outer handle surface for providing a secure hand grip on said outer surface of said handle, with a waste collection receptacle disposed between said hand and said gripping means;

a discharge opening located at the said trailing end of said handle for discharging said animal waste into a waste collection receptacle;

a waste collection receptacle removably secured over the trailing end of said handle;

said method comprising disposing said waste collection receptacle over said trailing end of said handle and gripping the handle at said gripping means with said waste collection receptacle disposed between said hand and said gripping means;

disposing the separating means portion of the pet litter scoop beneath the animal waste;

lifting the separating means upwardly thereby allowing unsoiled litter to pass through the separating means and fall below the separating means, while retaining soiled litter and animal waste on said separating means; and tilting the separating means at an angle sufficient to cause the retained soiled litter and animal waste to be transferred rearwardly out of the trailing end of said handle and into said waste collection receptacle.

15. The method of claim 14, wherein the litter scoop includes a tongue member disposed to engage said waste collection receptacle between the handle, and a closed end of said waste collection receptacle, and further including the step of contacting the waste collection receptacle with said tongue member.

16. The method of claim 15, wherein said separating means comprises a plurality of spaced grate members wherein each of said grate members has a crested upper surface.

17. The method of claim 14, wherein the waste-transferring handle has a circumference of about 7.85 inches to about 11 inches.

18. A pet litter scoop device for scooping and transferring animal waste into a removable waste collection receptacle comprising:

a waste-transferring handle means for hand gripping the scoop device and for transferring waste from a scooping end of the device to an open trailing end of the handle means, handle means having a sufficient diameter to allow soiled litter clumps to pass therethrough and capable of being gripped with one hand;

gripping means for providing a secure hand grip on an outer surface of said handle means, said gripping means being integral with an outer surface of said handle means;

a scooping means integral with said handle means for lifting and retaining animal waste and clumped litter material and allowing unsoiled litter material to pass therethrough;

a waste-receiving receptacle removably connected to the open trailing end of the waste-transferring handle means; and a receptacle-contacting means for contacting a side surface of the removable receptacle to lessen forward draping of said receptacle toward said animal waste during scooping by engaging said waste-receiving receptacle in an area between an open front end of said waste-receiving receptacle and a closed rear end of said waste-receiving receptacle.

* * * * *

UNITED STATES PATENT AND TRADEMARK OFFICE
CERTIFICATE OF CORRECTION

PATENT NO.   :   5,580,111
DATED        :   December 3, 1996
INVENTOR(S)  :   Bohn It is certified that error appears in the above-identified patent and that said Letters Patent is hereby corrected as shown below:

Column 8, line 43    after "handle means," insert -- said --.

Signed and Sealed this

Seventeenth Day of April, 2001

Attest:

NICHOLAS P. GODICI

Attesting Officer    Acting Director of the United States Patent and Trademark Office